United States Patent [19]
Ilbery

[11] Patent Number: 6,130,661
[45] Date of Patent: Oct. 10, 2000

[54] SEAMLESS PARALLEL NEIGHBORHOOD PROCESS HALFTONING

[75] Inventor: Peter William Mitchell Ilbery, Dundas, Australia

[73] Assignee: Canon Information Systems Research Australia PTY LTD, New South Wales, Australia

[21] Appl. No.: 08/847,221

[22] Filed: May 1, 1997

[30] Foreign Application Priority Data

May 1, 1996 [AU] Australia .................................. PN9589

[51] Int. Cl.[7] ...................................................... G09G 5/10
[52] U.S. Cl. ........................ 345/147; 345/138; 345/149; 358/534; 358/535; 358/536
[58] Field of Search ................................. 345/138, 147, 345/149; 358/534, 535, 536, 456, 458, 298, 466; 382/237, 270; 395/109

[56] References Cited

U.S. PATENT DOCUMENTS

| | | | |
|---|---|---|---|
| 4,486,788 | 12/1984 | Yamada | 358/298 |
| 4,851,825 | 7/1989 | Naiman | 340/728 |
| 5,010,814 | 4/1991 | Shishikura | 101/211 |
| 5,124,695 | 6/1992 | Green | 340/784 |
| 5,331,430 | 7/1994 | Xie et al. | 358/456 |
| 5,465,118 | 11/1995 | Hancock et al. | 348/396 |
| 5,499,037 | 3/1996 | Nakagawa et al. | 345/89 |
| 5,499,305 | 3/1996 | Lidke et al. | 382/270 |
| 5,537,223 | 7/1996 | Curry | 358/460 |

FOREIGN PATENT DOCUMENTS

| | | |
|---|---|---|
| 0 132 453 | 2/1985 | European Pat. Off. . |
| 0 606 988 | 7/1994 | European Pat. Off. . |
| 0 606 988 A2 | 7/1994 | European Pat. Off. ......... H04N 1/40 |

OTHER PUBLICATIONS

Knuth, "Digital Halftones by Dot Diffusion," acm Transactions of Graphics, 1987, pp. 245–273.

Primary Examiner—William A. Cuchlinski, Jr.
Assistant Examiner—Marthe Y. Marc-Coleman
Attorney, Agent, or Firm—Fitzpatrick, Cella, Harper & Scinto

[57] ABSTRACT

A method and apparatus are disclosed which permit a seamless halftoning of an image by halftoning regions of the image independently and/or in parallel. Each region of the image being arbitrarily determined, and being halftoned on the basis of halftoned pixel results of pixels within a predetermined neighborhood of the region. The arrangement providing a greater flexibility in the independent halftoning of the regions, while providing substantially seamless joins between abutting halftoned regions of the image. Further, the arrangement also provides a mechanism for parallel processing (halftoning) of abutting regions of an image with substantially seamless results.

28 Claims, 15 Drawing Sheets

PIXEL OF A MICRO TILE WITH LABEL 1

PIXEL OF A MICRO TILE WITH A LABEL 2

PIXEL OF A MICRO TILE WITH LABEL 3

SEAMLESS PARALLEL NEIGHBORHOOD PROCESS HALFTONING

The present invention relates to the field of digital image processing and more particularly to a method or digital halftoning continuous tone images.

BACKGROUND OF THE INVENTION

Digital halftoning of images is a process well known in the art and is normally used in display or printing devices having only bi-level capabilities of display or printing. As a result, halftoning techniques are often used in the binary representation of grey scale images in a wide range of applications such as laser printers, facsimile machines, lithography (newspaper printing), liquid crystal displays, plasma panels and other forms of flat panel displays. Gray scale images are typically converted to binary images using various halftoning techniques. Color images are normally divided into their various primary colors, for example, Red, Green and Blue (RGB) primaries are commonly used in video display devices, and Cyan, Magenta, Yellow and Black (CYMK) primaries are commonly used in printing devices, and the various halftoning techniques can be applied independently to each primary color. For a thorough discussion of the principles of halftoning, reference is made to a standard textbook, such as *Digital Halftoning* by R. Ulichney, MIT Press, Cambridge, Mass. (1990).

One particular halftoning technique is known as dithering. This technique involves a point-wise comparison of portions of the input image with a non-image, usually being an aperiodic array or mask. For every point or pixel in the image, depending on which of the point values of the image or the mask is larger, either an on or off value is used at the corresponding location in the binary output image. Again, with full color images the above process can be applied to each primary color channel independently.

While dithering has the advantage of simplicity and speed over other halftoning processes, dithering results in poor edge sharpness at edges of graphical objects forming part of (or the entire) image. Hence, it is desirable to have a halftoning process which has the favorable aspects of dithering such as speed and simplicity, but provides improved output image quality over point-process halftoning techniques such as dithering.

It is an object of the present invention to provide an alternative form of halftoning which leads to improved outputs, at least for a class of images. The class of images includes, for example, images where pixels are halftoned concurrently, images to be halftoned in a parallel blockwise manner or images to be halftoned in a sequential blockwise manner.

SUMMARY OF THE INVENTION

In accordance with a first aspect of the present invention there is provided a method of halftoning a grey scale image, said image comprising a plurality of pixels. This method comprises selecting a limited neighborhood halftoning base method for determining a halftone pixel result. The limited neighborhood halftoning base method is characterized by determining a halftone pixel result of a current pixel that utilizes at least one previously halftone pixel result of pixels in a limited neighborhood of the current pixel.

After the selection step, the method includes segmenting the image into a plurality of pixel regions; and halftoning each pixel region utilizing the selected halftoning base method in a manner to achieve an identical halftone pixel result for a current pixel irrespective of the order of halftoning each of said pixel regions.

Preferably, segmenting the image into a plurality of pixel regions, further includes dividing pixel regions into different sized micro tile regions. Each micro tile region, has substantially equal size, being typically separated by at least a predetermined neighborhood distance.

Preferably, the plurality of pixel regions are halftoned, substantially in parallel.

In accordance with a second aspect of the present invention there is provided a method of halftoning a grey scale image, said image comprising a plurality of pixels. This method comprises selecting a limited neighborhood halftoning base method for determining a halftone pixel result. The limited neighborhood halftoning base method is characterized by determining a halftone pixel result of a current pixel utilizing at least one previously halftoned pixel result of pixels within a predetermined limited neighborhood of the current pixel.

Following the selecting step, the method includes segmenting the image into a plurality of pixel regions, and halftoning each of the pixel regions independently, utilizing the selected halftoning base method to achieve seamless halftone results across the image.

In accordance with a third aspect of the present invention there is provided a method of halftoning a grey scale image which comprises a plurality of pixels. The method includes a step of selecting a halftoning base method, wherein the halftoning base method is characterized by determining a halftone pixel result of a current pixel utilizing at least one halftone result of a previously halftoned pixel within a predetermined distance of the current pixel.

The next step is dividing the image into a plurality of adjacent first regions comprising more than one pixel.

The method then includes a step of segmenting the image into a plurality of non-overlapping second regions adapted to substantially cover the image.

The method also includes halftoning each pixel of the second region utilizing the selected halftoning base method in a manner to achieve an identical halftone pixel result for a current pixel irrespective of the order of halftoning each of the second regions.

In accordance with a fourth aspect of the present invention there is provided a method of halftoning a grey scale image. The image comprises a plurality of pixels, and the method comprising the steps of selecting a limited neighborhood halftoning base method for determining a halftone pixel result. The limited neighborhood halftoning base method characterized by determining a halftone pixel result of a current pixel utilizing at least one halftone result of a previously halftoned pixel.

Next, the method includes determining a limited neighborhood distance to be a minimum distance between two pixels, for the selected limited neighborhood halftoning base method.

Next, the method includes dividing the image into a plurality of adjacent non-overlapping first regions comprising more than one pixel.

The method further includes a step of labeling each one of the first regions with a predetermined order representing an order for halftoning the first regions.

The method further includes step of grouping the first regions to provide a plurality of second regions adapted to substantially cover, without overlap, the image to be halftoned.

Following the grouping step, the method includes segmenting the image into a plurality of third regions of pixels comprising at least one of the second regions and a minimum number of first regions having pixels with halftone results capable of contributing to at least one pixel of the second region.

Following the segmenting step, the method includes halftoning each pixel of the second region utilizing the selected halftoning base method in a manner to achieve an identical halftone pixel result for a current pixel irrespective of the order of halftoning each of said second regions.

In accordance with a fifth aspect of the present invention there is provided a method of halftoning a digital image, the image comprising a plurality of pixels. The method comprising the steps of selecting a halftoning base method characterized by determining a halftone pixel result of a current pixel utilizing at least one of previously halftone pixel result of pixels in a predetermined neighborhood of the current pixel.

Following the selecting step, the method includes dividing the image into a plurality of first pixel regions.

Following the dividing step, the method includes a step of segmenting the image into a plurality of second pixel regions.

After the segmenting step, the method includes halftoning each first pixel region in a manner to provide seamless halftone results between adjacent second pixel regions of said image.

In accordance with a sixth aspect of the present invention there is provided a seamless halftoning apparatus.

The apparatus includes an image input data store for receiving a digital input image comprising pixels to be halftoned. A region selection means is used to select from said input store predetermined first region of the input image. A tile halftone engine is used for halftoning the selected first region. A tile selection means is coupled to the tile halftone engine for determining, from the halftoned first region, a second region comprising halftoned pixels. An image output data store is used for storing the second region of halftoned pixels.

In accordance with a seventh aspect of the present invention there is provided a seamless halftoning system, capable of halftoning an image in a parallel blockwise manner, comprising a plurality of tile engines adapted to halftone a multitude of regions of the image. Each tile engine is able to halftone at least one region of the image, and more than one tile engine provides halftone results of the image concurrently.

BRIEF DESCRIPTION OF THE DRAWINGS

The embodiments of the present invention are to be described hereinafter with reference to the accompanying drawings in which.

DESCRIPTION OF THE EMBODIMENTS OF THE INVENTION

Figure 1:
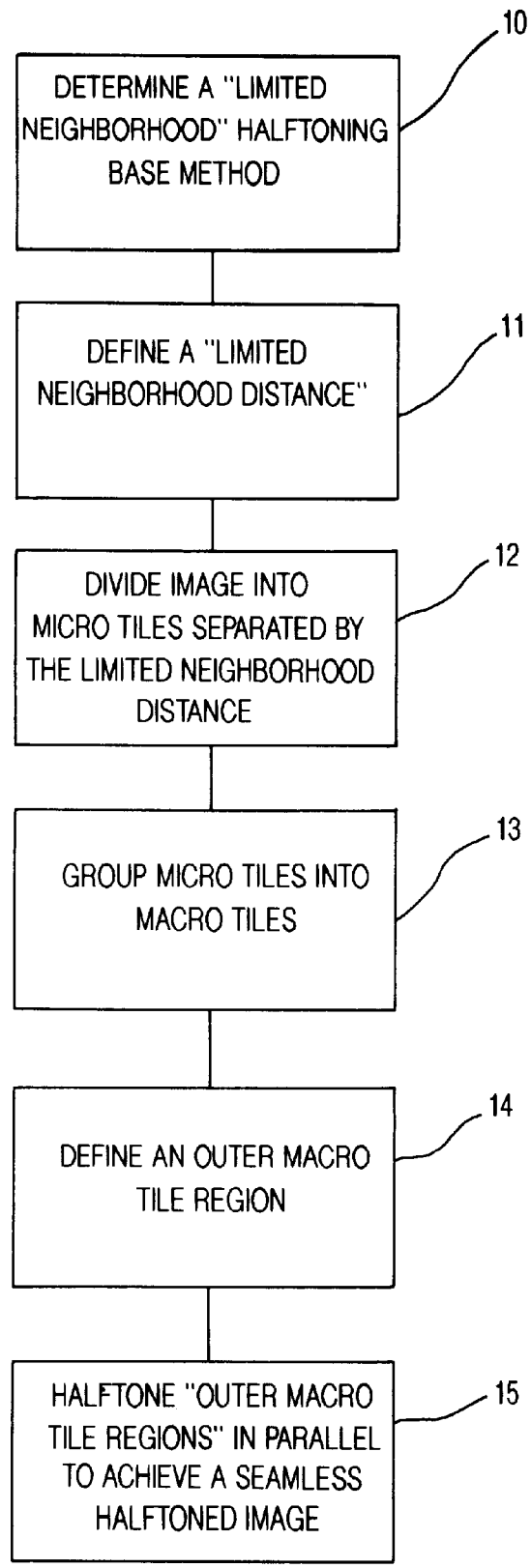
FIG. 1 shows a flow chart of the steps of seamless parallel neighborhood-process halftoning in accordance with the preferred embodiment of the present invention.

Referring to FIG. 1, there is shown a flow chart of the steps of halftoning a digital image, in accordance with the preferred embodiment of the present invention. At an initial step 10, a "limited neighborhood halftoning base method" (often referred to hereinafter as the base method) is selected (or determined), which allows the determination of a halftone result of a current pixel by utilizing, preferably, input values and halftone results, if any, of pixels within a predetermined number of pixels surrounding the current pixel to be halftoned. The predetermined number of surrounding pixels define what is referred to herein as a "limited neighborhood of pixels" (or a "limited neighborhood").

Figure 2:
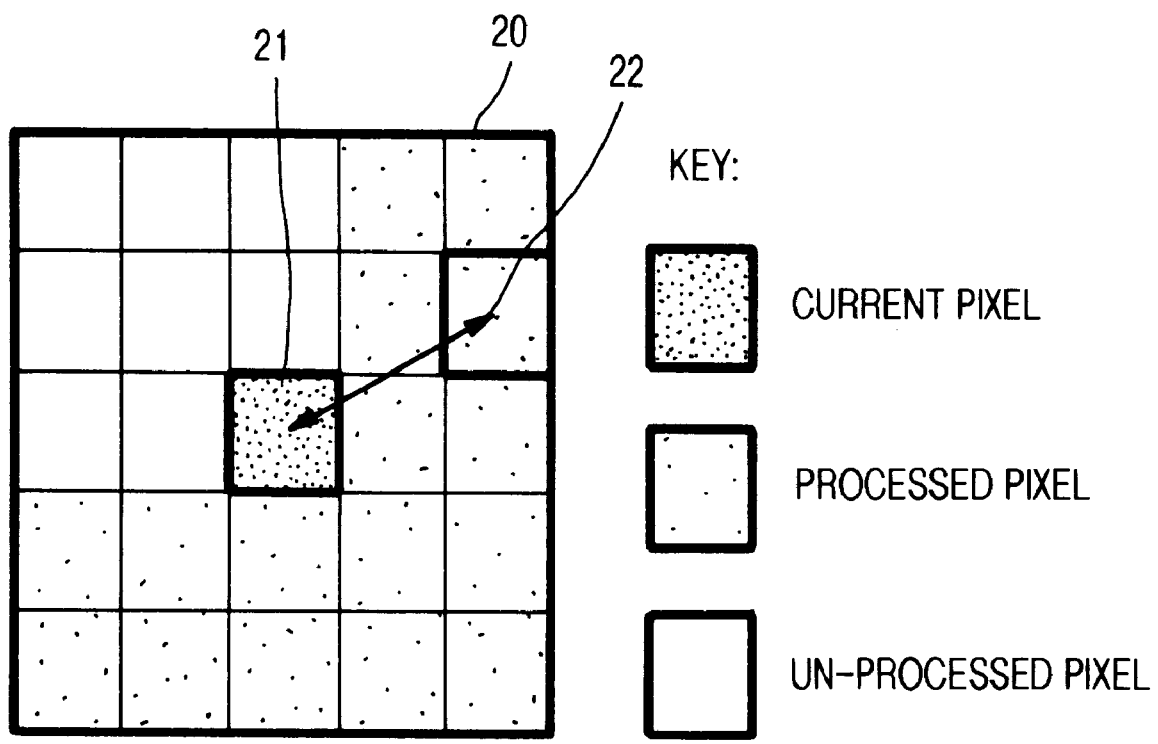
FIG. 2 illustrates an example of a limited neighborhood of pixels in accordance with the preferred embodiment.

Referring now to FIG. 2, there is shown an example of a "limited neighborhood" 20 in accordance with the preferred embodiment. As shown in the drawing, a current pixel is indicated with a fill of cross hatching, a processed pixel is indicated by slanted or diagonal line hatching, and an unprocessed pixel is shown by no hatching (white fill). In this example the limited neighborhood 20 comprises a 5×5 pixel array and, while not a requirement, the size of the limited neighborhood is determined by the number of halftone output values per pixel. For example, if an output pixel value is represented by a single bit, zero (0) or one (1) ("off" or "on") and it is desired that this single bit output per pixel is used to represent 256 grey-levels from say color black to color white (inclusive), then at a first grey-level away from color black towards color white, one pixel in 255 would be switched "on". The "limited neighborhood" for this single bit example is a region greater than 255 pixels and typically a 16×16 pixel region or more. As another example, wherein four bits are used to represent each color of a display device, and it is desired to represent 256 levels for each color, then a 4×4 pixel or more region can be used to represent a scale of 256 levels per color.

In the four bits per color example a "limited neighborhood" can be defined by any region greater than 15 pixels and a convenient pixel region to use as the limited neighborhood is a 5×5 pixel array.

A halftoning technique appropriate for use as a base method is illustrated in FIG. 2. The halftoning technique permits the determination of a halftone result of a current pixel 21 (indicated by cross hatching) using:

1) a halftone result of one or more previously halftoned (processed) pixels 22 (indicated by diagonal line hatching) if any, and
2) optionally, an input value of one or more pixels in the limited neighborhood 20.

Where halftoning a pixel and in its limited neighborhood 20 no halftone results are available, the output value (i.e. halftone result) for the first pixel can be determined, for example, by assigning an output value which is nearest to an input value of the pixel.

Preferably, the base method utilizes all halftone results of previously processed pixels 22 in the current pixel's predetermined limited neighborhood 20. An example of a halftoning method appropriate for use as a "limited neighborhood halftoning base method" is disclosed in, and reference is made to, U.S. patent application Ser. No. 08/779,009 entitled "Force Field Halftoning" filed by Peter W. M. Ilbery on Jan. 2, 1997, the contents of which are hereby incorporated by way of cross-reference.

In Force Field Halftoning, the halftoned result of the current pixel 21 is dependent on the halftone results of previously processed pixels 22 and can be adapted to halftone pixels in a portion of an image independently of halftone results outside said portion of the image.

It will be apparent to those skilled in the art, that while Force Field Halftoning is particularly adapted as a base method for the present invention, the present invention is not limited thereto. Other halftoning techniques adapted to halftone a portion of an image utilizing halftone results of pixels within a portion of an image and independent of halftone results of pixels external to said portion can be substituted as a base method without departing from the scope and spirit of the invention.

In Force Field Halftoning, the halftone output value of a current pixel is typically decided as that halftone output value which minimizes a cost measure of the following form $$\Sigma(W_i e_i e_{current}).$$

In the above cost measure:
1) $e_i$ is an error measure for a processed pixel$_i$ and typically $$e_i = input_i - result_i,$$

where:
input$_i$ is the input value for the processed pixel i, and result$_i$ is the halftone output value for the processed pixel i;
2) $e_{current}$ is an error measure for the current pixel assuming a particular halftone output value and typically $$e_{current} = input_{current} - result_{current},$$

where:
input$_{current}$ is the input value for the current pixel, and result$_{current}$ is the particular halftone output value for the current pixel;
3) $w_i$ is a weight value which depends only on the relative position of the processed pixel i from the current pixel; and
4) the summation is typically made over all processed pixels i with an error measure $e_i$ of the same sign as $e_{current}$.

Clearly, Force Field Halftoning can be used as a limited neighborhood halftoning method by setting $w_i$ in the Force Field Halftoning costs measure equal to zero for all pixels i which are beyond a certain distance from the current pixel.

Another example of a halftoning method which can be used as a limited neighborhood halftoning base method is halftoning which minimizes an error measure.
An example of an error measure is:

$$|\Sigma(W_i e_i) + w_{current} e_{current}|$$

In the above error measure:
1) $e_i$ is an error measure for a processed pixel i and typically $$e_i = input_i - result_i,$$

where:
input$_i$ is the input value for the processed pixel i, and result$_i$ is the halftone output value for the processed pixel i;
2) $e_{current}$ is an error measure for the current pixel assuming a particular halftone output value and typically:

$$e_{current} = input_{current} - result_{current},$$

where:
input$_{current}$ is the input value for the current pixel, and result$_{current}$ is the particular halftone output value for the current pixel;
3) $w_i$ is a weight value which depends only on the relative position of the processed pixel i from the current pixel;
4) $w_{current}$ is a weight value for the current pixel; and
5) the summation is typically made over all processed pixels i.

Similarly, error minimization halftoning can be used as a limited neighborhood halftoning method by setting weight values used in the error measure, such as $w_i$ in the above error measure, equal to zero for all pixels i which are beyond a certain distance from the current pixel.

Returning now to FIG. 1, a second step 11 in the preferred embodiment is to determine a "neighborhood distance", which is typically defined by the chosen "limited neighborhood" as hereinbefore described. The neighborhood distance is a minimum separation distance between two pixel centers, wherein a halftone result of one of the two pixels is determined without reference to a halftone result or input pixel value of the other one of the two pixels. The neighborhood distance can also be expressed as the minimum separation distance between two regions of pixels that can be halftoned independently as hereinafter described.

The neighborhood distance substantially defines a radial area surrounding a current pixel, for which one or more previously halftoned results of pixels within the radial area can be used to determine a halftone result of the current pixel. Consequently, halftoned results of pixels outside the radial area, preferably, do not directly contribute to the halftoning of the current pixel.

A third step 12 (FIG. 1) of the preferred embodiment is to divide a digital image, or part thereof, into a plurality of disjoint "micro tiles" wherein each micro tile represents a region of pixels of the digital image. The micro tiles are appropriately labeled in a manner so that each pixel of a micro tile having one label is separated from each pixel in another micro tile having the same label by at least the chosen neighborhood distance.

Figure 3:
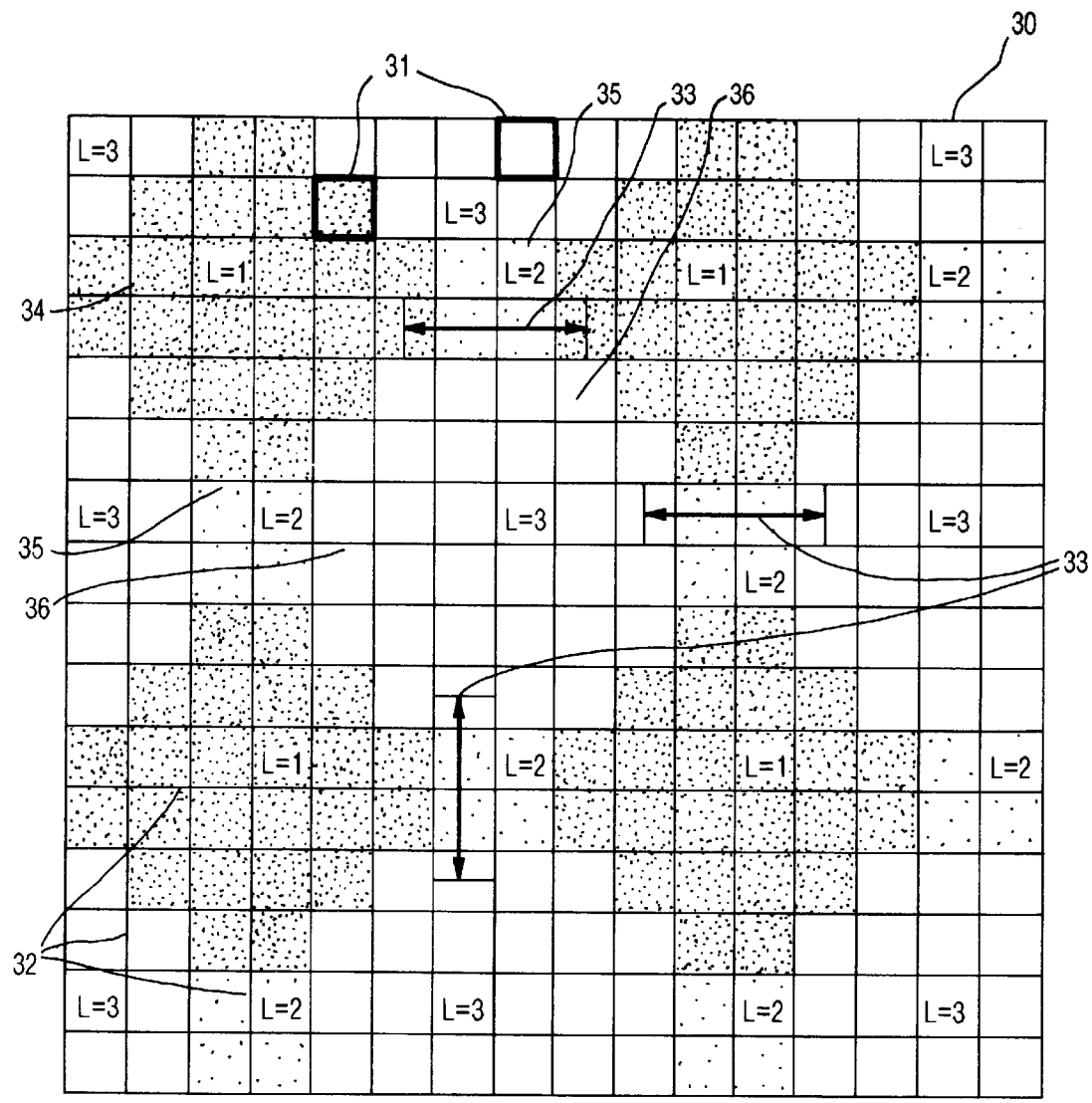
FIG. 3 illustrates an example of segmenting a pixel based image into micro tiles in accordance with the preferred embodiment of the present invention.
Figure 3:
Figure 3:
Figure 3:

FIG. 3 illustrates an example of dividing a digital image 30 (or part thereof) comprising pixels 31, into a plurality of disjoint micro tiles 32 where each micro tile is a predetermined number of pixels 31. In this example, each micro tile 32 is appropriately labeled and associated with an integer L, where $1 \leq L \leq LMAX$ and LMAX is a predetermined integer. The example illustrated in FIG. 3 has been chosen to have an LMAX equal to 3, hence three types of micro tiles 32 are shown as L=1, L=2, and L=3.

The micro tiles 32 are positioned in a manner so that each pixel of a micro tile 32 having one label (e.g., L=1) is separated from each pixel of another micro tile 32 having the same label (e.g., L=1) by at least a neighborhood distance 33.

Preferably, as illustrated in FIG. 3, each micro tile 32 of the same label L takes on the same shape and size and is formed of a set of connected (adjacent) pixels. However, these features are not a requirement of the technique herein described.

Referring again to FIG. 1, the next step 13 of this embodiment is to group the labeled micro tiles to form "macro tiles", in a manner so that each macro tile is formed of a plurality of micro tiles and the micro tiles are fully contained within one and only one macro tile.

Figure 4:
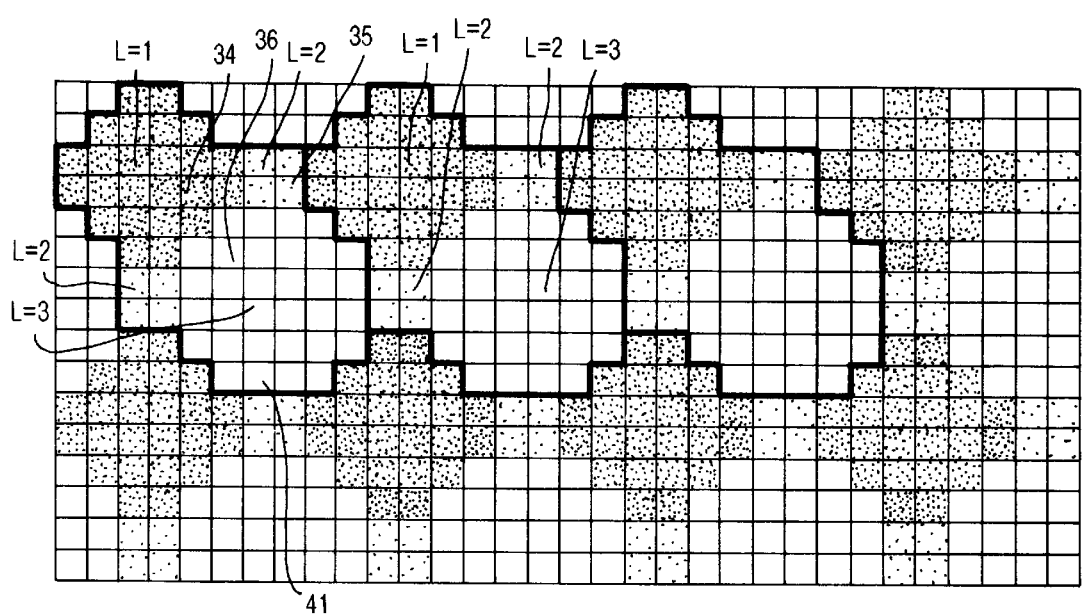
FIG. 4 illustrates an example of grouping the segmented micro tiles of FIG. 1 into macro tiles in accordance with the preferred embodiment of the present invention.

Turning now to FIG. 4, there is shown an example of a plurality of non-overlapping "macro tiles" 41 comprising only complete "micro tiles" 32. That is, if a pixel 31 of any one micro tile is in a "macro tile" 41, then all pixels of the micro tile are in the macro tile 41. Typically, more than one complete micro tile is grouped together to form a micro tile, and each macro tile comprises a grouping of complete macro tiles arranged in a manner that each macro tile conjoins to cover, without overlap, substantially all the region of pixels of the digital image to be halftoned.

Preferably, micro tiles 32 are arranged in a macro tile 41 in a non-overlapping manner to cover the entire macro tile 41. However, the micro tile 32 can be arranged with overlap within a macro tile 41 without departing from the scope or spirit of the invention.

While macro tiles can be halftoned in parallel as hereinafter described, or can be halftoned sequentially, it is desirable that, when halftoning macro tiles in parallel, each macro tile be of identical shape and size.

The next step 14 in the process of halftoning a digital image shown in FIG. 1 is to define an "outer macro tile" region, comprising at least one macro tile 41 and including a minimum set of complete micro tiles 32 having at least one previously halftoned pixel whose halftone pixel result is capable of contributing to a halftoning of a pixel of the macro tile 41.

Figure 5:
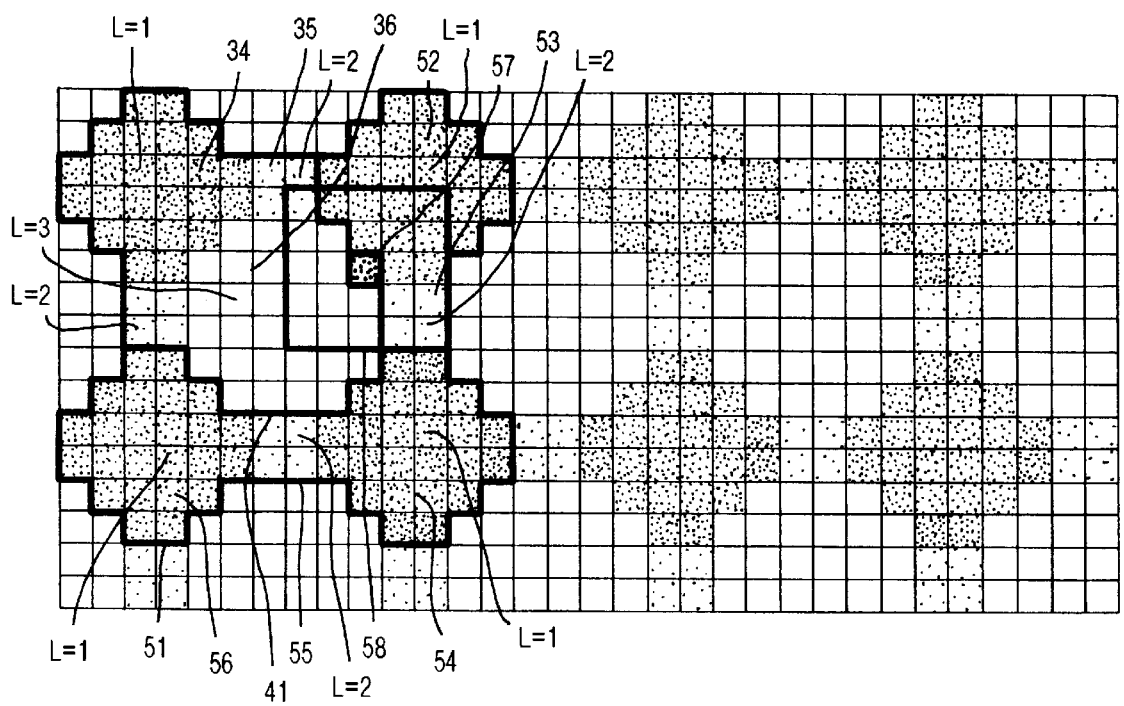
FIG. 5 illustrates an example of an "outer macro tile" region of pixels utilized by the preferred embodiment of the present invention in halftoning the region of pixels represented by the macro tile of FIG. 4.

Illustrated in FIG. 5 is an example of an "outer macro tile" region 51 comprising at least one macro tile 41 and including a minimum set of complete micro tiles (34–36, 52–56) that, when halftoning pixels of the macro tile 41, comprise at least one pixel, with a halftone pixel result, capable of contributing to the halftoning of at least one pixel of the macro tile 41.

The outer macro tile 51 shape is dependent on the order at which the micro tiles 32 are processed (halftoned) and in this example the micro tiles (34–36, 52–56) are halftoned in order of their ascending label value L from L=1 to LMAX. That is, all L=1 micro tiles are halftoned before all L=2 micro tiles, and so on, until all L=LMAX (LMAX=3 in FIG. 5) are processed (halftoned) within each outer macro tile region 51. Consequently, this results in the halftoning of the complete macro tile 41 relying only on halftoned pixel results within the outer macro tile. To halftone a current pixel 57 of, for example, the macro tile 41, utilizing the base method with a 5×5 limited neighborhood 58, the base method can rely upon micro tiles 35, 36, 52, and 53, having previously halftoned pixels, with halftone results, capable of contributing to the halftoning of the current pixel 57, and hence capable of contributing to the halftoning of the macro tile 41.

The halftoning of the macro tile 41 is only dependent upon pixels within the outer macro tile 51. Consequently each outer macro tile 51 may be processed, to halftone the corresponding macro tile 41, in any predetermined order and preferably all the (outer) macro tile 51 regions of the digital image are processed in parallel.

While the outer macro tile 51 region may be processed in parallel, or sequentially irrespective of the order of which outer macro tile 51 region is processed first, the micro tiles (34–35, 52–56) are processed (halftoned) in the predetermined order, being, preferably in ascending order of label value L from L=1 to L=LMAX.

Figure 6:
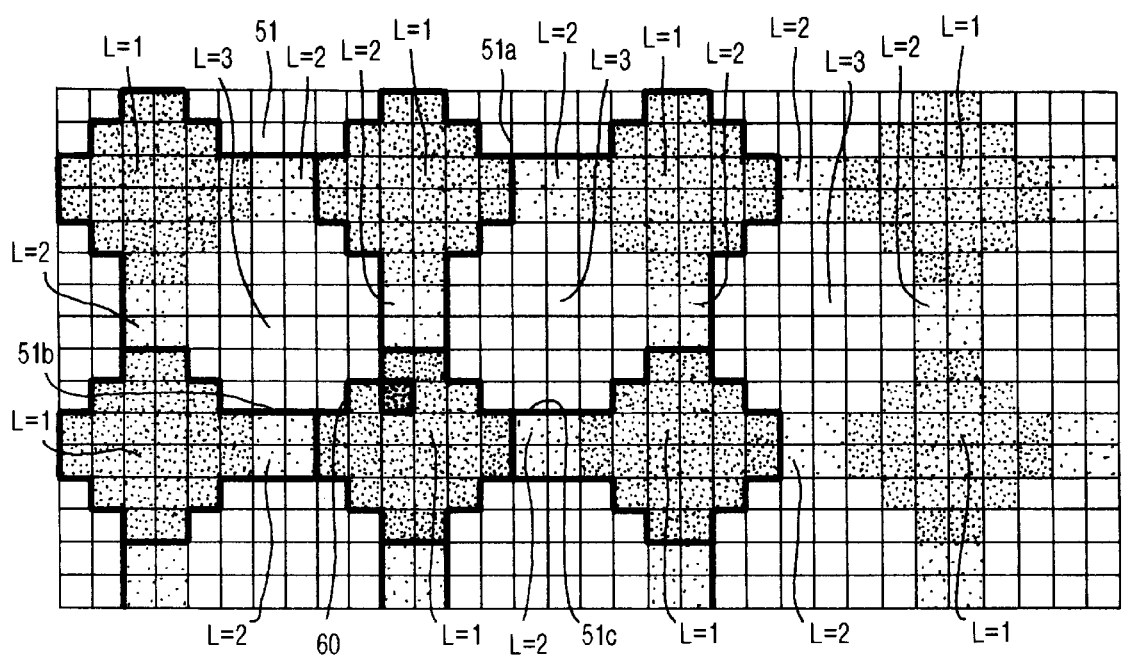
FIG. 6 shows the overlapping outer macro tile regions of FIG. 5 in accordance with the preferred embodiment of the present invention.

Referring to FIG. 6, there is illustrated an example of the overlapping nature of the outer macro tiles 51. A pixel 60 may fall in one or more overlapping outer macro tiles (51, 51a–c) and irrespective of the order of processing the outer macro tile regions (51, 51a–c) a halftone result for the pixel 60 is identical. For example, irrespective of whether the outer macro tile 51 is processed before outer macro tile 51a which is processed before outer macro tile 51b and in turn outer macro tile 51c is processed after 51b, or the outer macro tiles (51,51a–c) are processed in parallel (step 15 of the embodiment of FIG. 1), or in any other predetermined sequence, the halftone output result of the pixel 60 remains the same.

This feature of producing the same halftone result for a current pixel irrespective of the order of processing (halftoning) outer macro tile regions, together with the use of a limited neighborhood halftoning base method, provides substantially seamless joins between adjacent pairs of macro tile regions.

Figure 7:
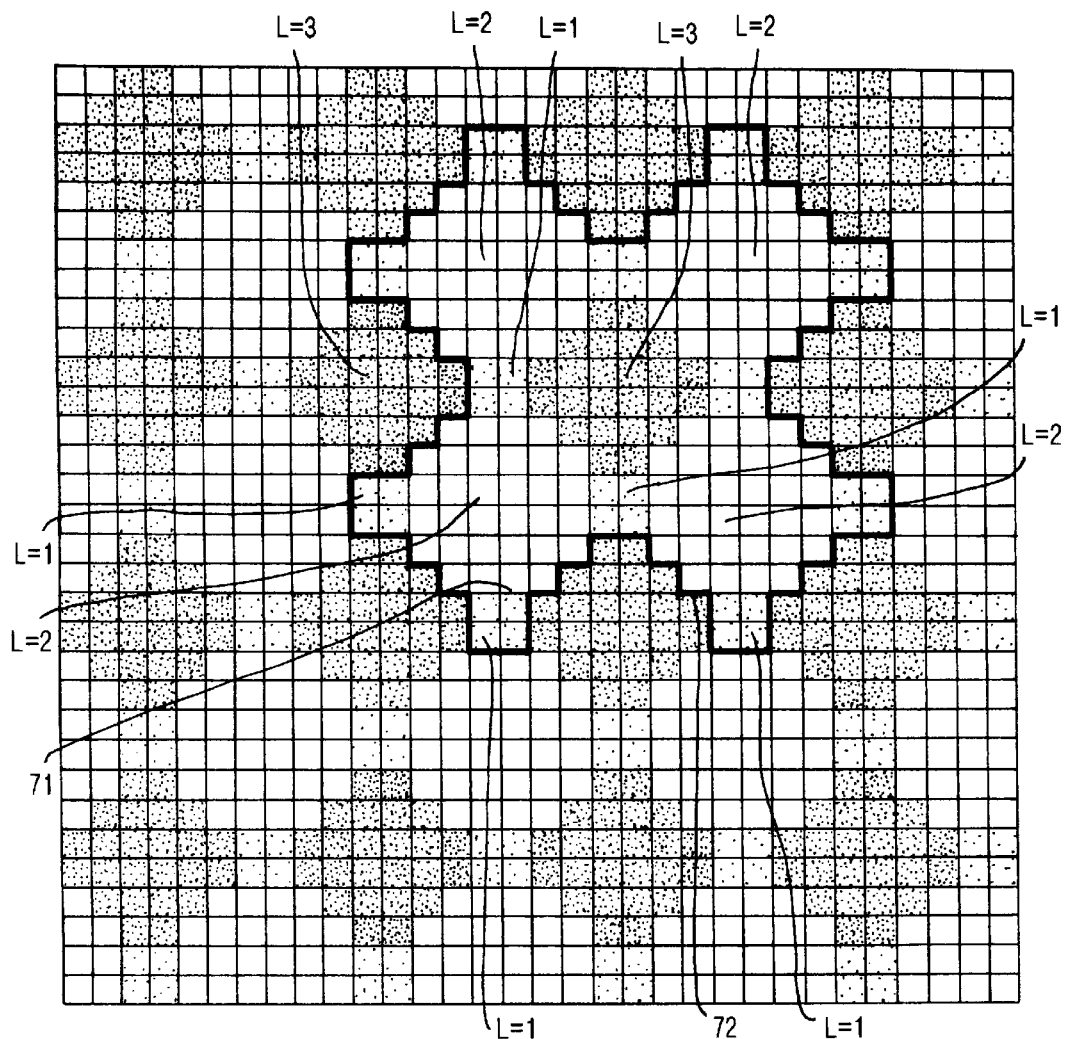
FIG. 7 illustrates an alternative example of an outer macro tile region of FIG. 5.

Referring now to FIG. 7, there is shown an alternative label arrangement for the micro tiles of FIG. 5 and if the micro tiles are again processed in ascending label "L" order, that is all L=1 micro tiles are halftoned before all L=2 micro tiles, and so on before all L=LMAX micro tiles (in FIG. 7 LMAX=3), an alternative macro tile 71 can be predetermined and a corresponding alternative outer macro tile region 72 results.

In general, each outer macro tile of FIGS. 6–7 may be halftoned independently, in a predetermined sequence or, in parallel, to obtain a halftone result for each pixel within a macro tile, where the macro tile is included within the outer macro tile. Each micro tile within the outer macro tile is halftone in a predetermined order, preferably according to the ascending order of the label values L.

An alternate embodiment of the present invention is described hereinafter with reference to FIGS. 8 to 15. In the alternate embodiment, an image is segmented (i.e., divided without overlap) into a plurality of macro tiles ("macro regions") and used together with a neighborhood process halftoning (base) method to generate halftone results for each macro tile. It is desirable that the alternate embodiment in generating halftone results for each macro tile can:

process a macro tile independently of a processing of another macro tile of the image; and provide seamless halftone results between (adjacent) macro tiles.

Halftone results are herein referred to as seamless if the halftone results for any two pixels within a predetermined distance of each other are consistent, or are "coordinated", in the sense that a halftone result of at least one of the two pixels is determined by using a halftone result of the other of the two pixels.

Processing macro tiles independently allows a parallel processing of the macro tiles to an extent that halftoned results for a plurality of macro tiles can be generated concurrently.

Figure 8:
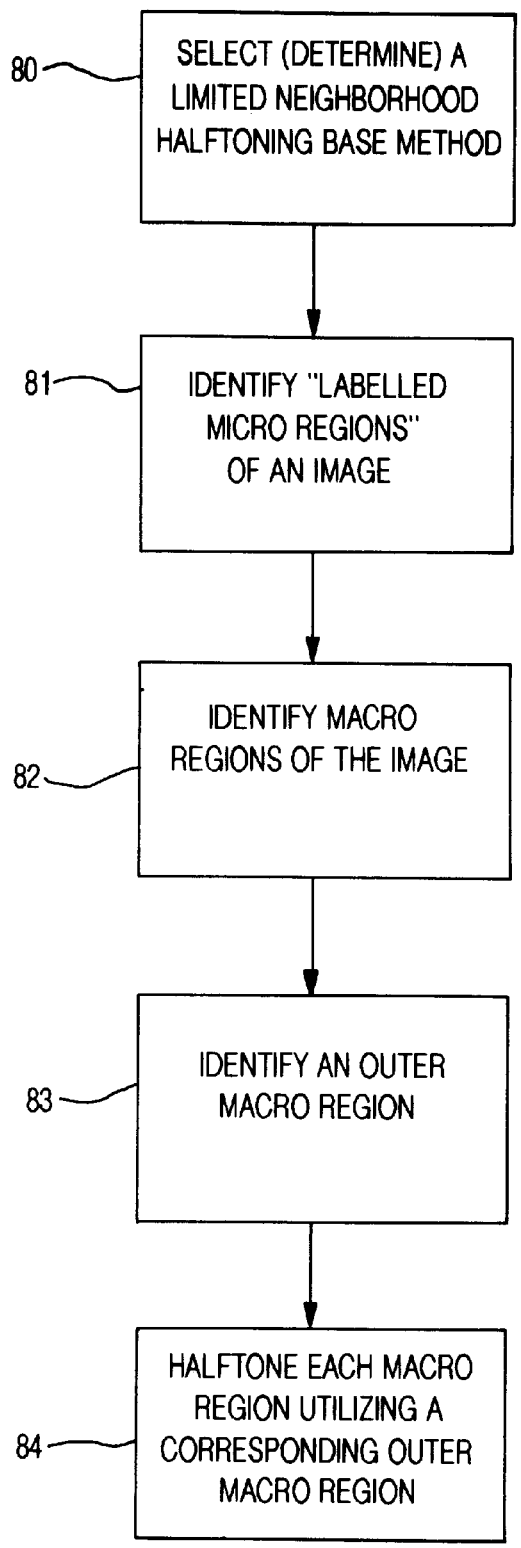
FIG. 8 is a schematic diagram of an overview of an alternate embodiment of the present invention.

Referring now to FIG. 8, there is shown an overview of the alternate embodiment. An initial step 80 is that of selecting (determining) a "limited neighborhood" halftoning base method for use as a halftoning technique to halftone a digital image.

Preferably, the halftoning base method is a technique for generating halftone results for a set of pixels, using the halftone results of previously halftoned pixels within a predetermined limited neighborhood of the set of pixels. The halftoning base method preferably has the advantage that it can be applied whether none, some or all of the pixels within the predetermined limited neighborhood have been previously processed. The generated halftone results for the set of pixels are thereby consistent (or co-ordinated) with each other and are consistent with the halftone results of any previously processed neighboring pixels. Preferably, the halftone base method is further characterized by determining a halftone result for a current pixel as a function of relative distance between the current pixel and previously halftoned pixels. For example, a distance measure can be determined between a current pixel and a previously halftoned pixel result and the halftoned pixel result as well as the distance measure is used in the determination of the current pixel result.

The next step 81 shown in the overview diagram of FIG. 8 is that of identifying and preferably labeling a plurality of micro regions, each micro region comprising a plurality of pixels of an image. Although the size, in number of pixels, and shape of each micro region can be chosen arbitrarily, the union of substantially all micro regions of an image should cover the image to be halftoned.

Figure 9:
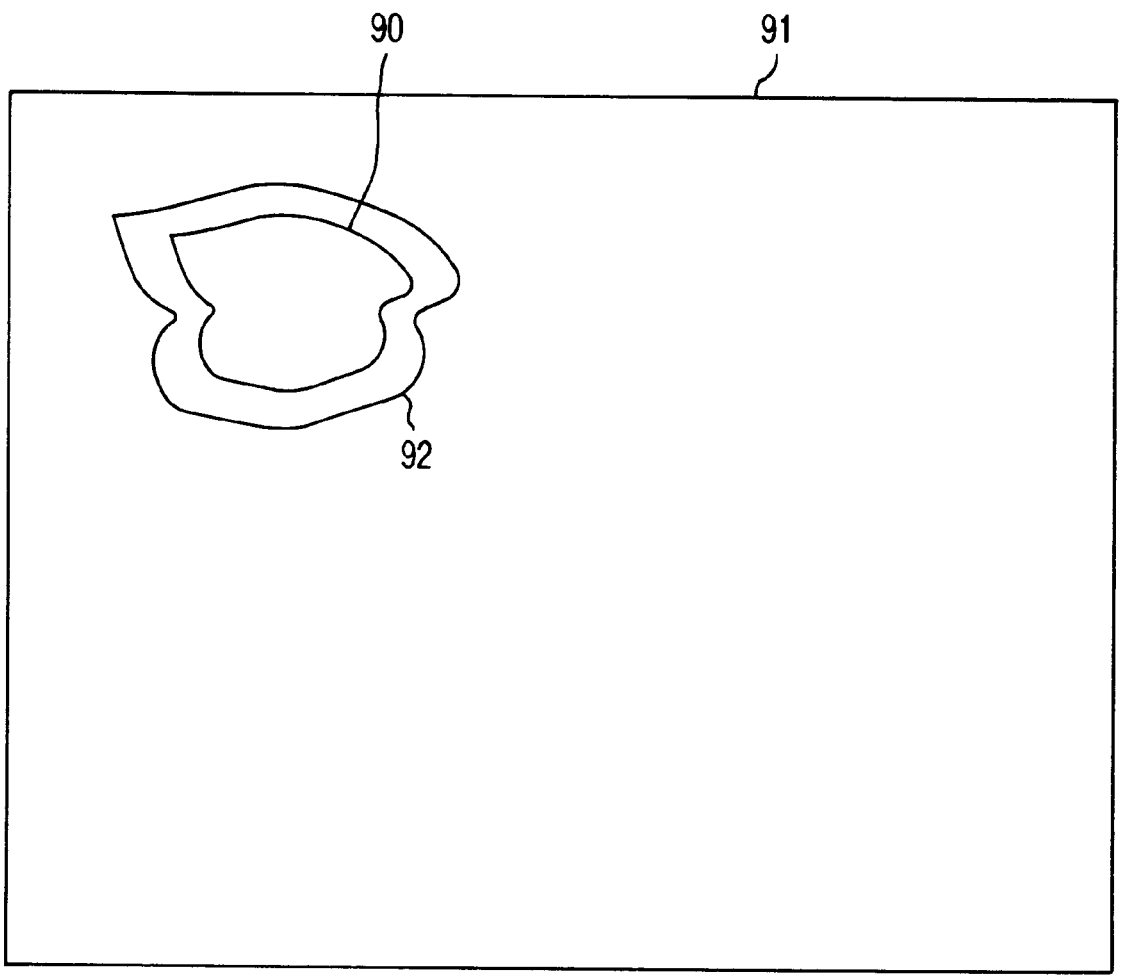
FIG. 9 illustrates a micro region and a micro region neighborhood in accordance with the alternate embodiment.

Turning to FIG. 9, there is shown a micro region 90 of a plurality of micro regions (not shown in FIG. 9) that substantially cover an image 91. For a predetermined (or selected) limited neighborhood halftoning base method, and the micro region 90 of pixels, a "micro region neighborhood" 92 can be determined. The micro region neighborhood 92 consists of a super-set of pixels comprising pixels of the micro region and including in addition those pixels are within a predetermined/distance of the micro region. Typically, the micro region neighborhood includes previously halftoned pixels with results that are to be used in the application of the halftoning base method for generating halftone results for the micro region. Preferably, each micro region 90 of the image 91 has a corresponding micro region neighborhood 92.

Micro regions of an image are labeled from a first predetermined label to a second predetermined label in such a manner that any two micro regions having the same label are separated by at least a predetermined distance. Preferably, the first predetermined label is LMIN=1 and the second predetermined label (LMAX) is a value less than a total number of micro regions of an image. A preferred feature in processing micro regions is to have an equal predetermined number of micro regions of each label.

Figure 10:
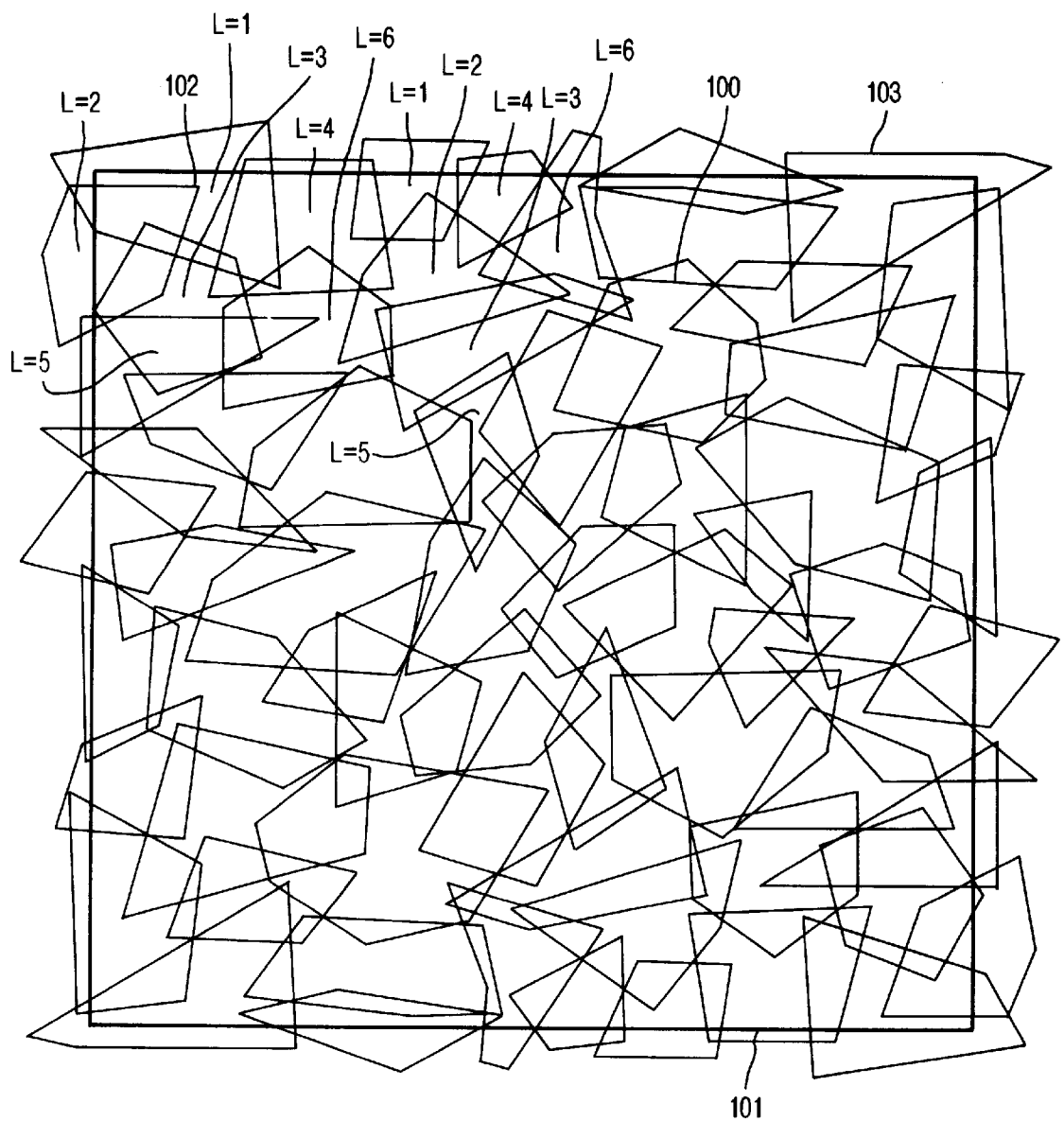
FIG. 10 shows a plurality of overlapping micro regions of an image.

FIG. 10 illustrates an example of a plurality of micro regions 100 of an image 101, labeled 102 in such a manner that micro regions of the same label are at least separated by a predetermined distance. The predetermined distance being a sufficient distance so that on an application of the halftoning base method to a micro region of one label the generated halftone results are independent of halftone results of another micro region of the same label. That is, halftone results of pixels with a micro region of one label are not influenced by halftone results of pixels with another micro region of a same label. This can be optionally stated as: no pixel of one micro region of label L is within the micro region neighborhood of another micro region of label L. In the example shown in FIG. 10, LMIN=1 and LMAX=6, and labeling of the micro regions, from LMIN to LMAX, is performed in a (pseudo) random manner, with a result that any two micro regions of the same label are separated by at least the predetermined distance. The predetermined distance in FIG. 10 requires that a micro region 100 of one label (e.g., micro region L=2) does not overlap a micro region neighborhood of another micro region of a same label (e.g., another micro region L=2).

According to the alternate embodiment, micro regions can be identified with overlap, such that overlapping micro regions have one or more of pixels in common, or the micro regions can be identified without overlap having no pixels in common. Optionally, the alternate embodiment may be practised with a combination of overlapping and non-overlapping micro regions without departing from the scope and spirit of the invention. In either case, whether the micro regions are determined (identified) with overlap, without overlap or a combination of both, a union all micro regions of an image should be determined to cover an entire region of the image to be halftoned. Further, when micro regions are determined and labeled, as hereinbefore described, micro regions having a same label cannot overlap, since micro regions of the same label must be separated by a predetermined distance.

The image 101 of FIG. 10 is processed using a step-wise parallel technique in which, first, each micro region of label L=1 is halftoned by an application of the halftoning base method. Then, each micro region of label L=2 is halftoned, followed by a halftoning of each micro region of L=3, until each micro region of label L=6 is halftoned. Preferably, more than one micro region of the same label is processed concurrently (i.e., in parallel). The reference to step-wise parallel indicates that a plurality of micro regions of a particular label can be halftoned in parallel.

The step-wise parallel technique provides a seamless halftone result for an image in that there exists a predetermined distance for which two pixels within the predetermined distance of each other have halftone results that are inter-dependent. That is a halftone result of at least one of the two pixels depends on a halftone result of the other of the two pixels.

Typically, for irregular shaped micro regions covering a regular shaped (rectangular) image, some of the micro regions 100 can extend beyond 103 the boundaries of the image 101, as they do in the example illustrated by FIG. 10. To provide pixel values to the regions that extend beyond the boundaries of the image 101, one of several techniques can be adopted and include:

a) assigning all pixel values beyond the boundaries of an image to zero; or b) reflecting a mirror image across each boundary of an image and using the corresponding pixel values.

Alternately, a micro region that crosses an image boundary can be clipped to coincide with the image boundary.

Although the alternate embodiment is described with reference to an example of irregular shaped, sized and positioning of micro regions 100 over the image 101, in practice it is desirable to select a regular grid pattern for the positioning of micro regions, and preferably a shape and size of each micro region having the same label is chosen to be substantially the same. This will facilitate a design and/or implementation of hardware (or software) engines dedicated to the halftoning of the micro regions (and/or macro regions).

Figure 11:
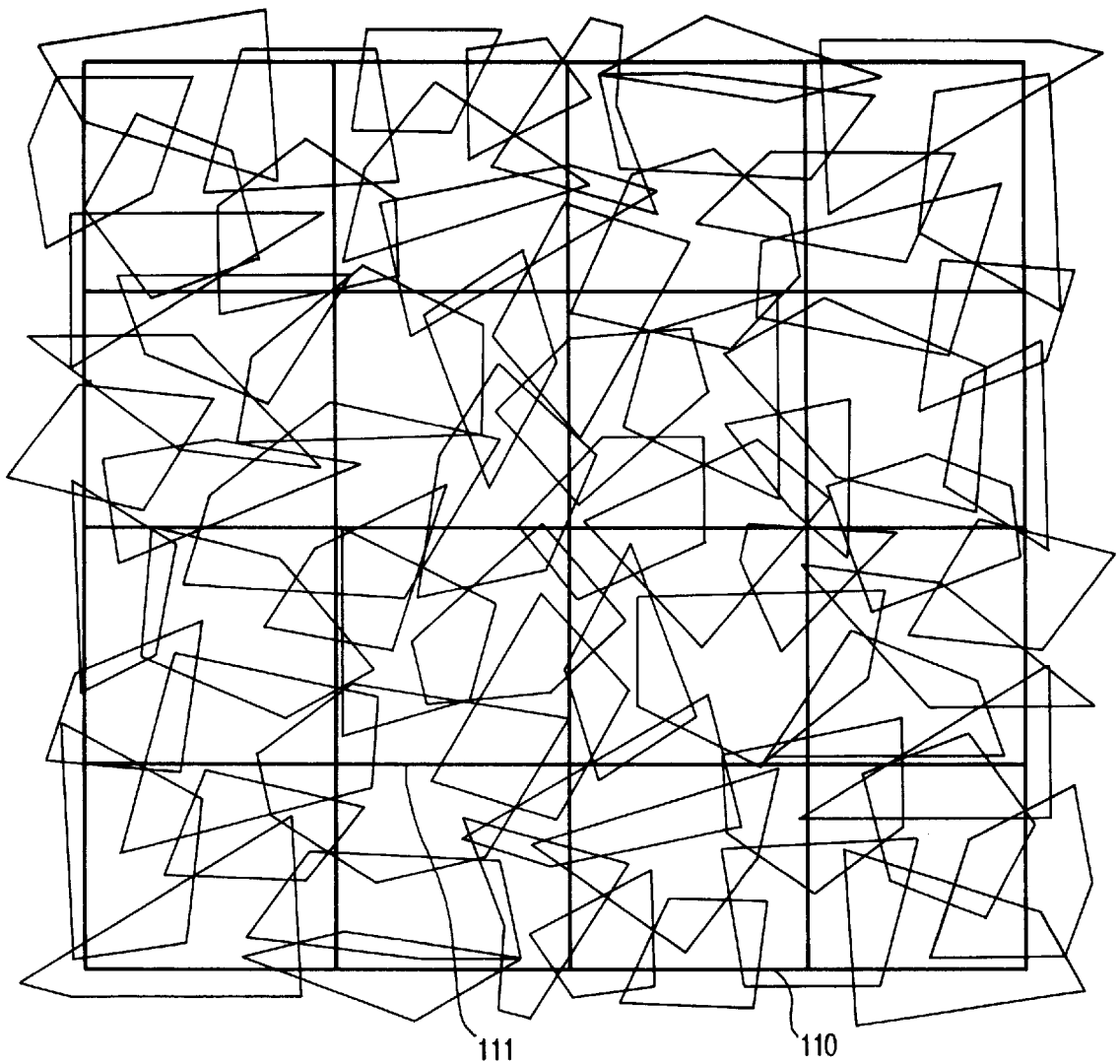
FIG. 11 illustrates a segmenting (dividing without overlap) of an image into a plurality of macro regions.

Referring again to FIG. 8 and the next step 82 of the overview diagram, there is shown a step of determining (identifying) macro regions (or tiles) which segment an image. Each macro region is a set of pixels; the macro regions cannot overlap and the union of macro regions cover the image to be halftoned. An example of determining tiles 111 (macro regions) for an image 110 is shown in FIG. 11 and for the sake of clarity the tiles 111 are shown as regular shaped regions (rectangles) which segment the image 110. However, the tiles 111 segmenting the image 110 need not be regular and their shape and size can be arbitrarily chosen. Examples of segmenting an image (i.e., dividing the image into non-overlapping regions) include: the entire image as a single tile; identifying an arbitrary shape and size region as one tile and the remain portion of the image as another tile; identifying tiles to be coincident with a plurality of micro regions; or where possible combinations of the regions for tiles described above. Macro regions (tiles) do not necessarily have an association to the size and shape of micro regions, unless the association is a preferred feature as is the case in the preferred embodiment hereinbefore described. That is, a macro region of the preferred embodiment takes on a shape and size according to a shape and size of a plurality of micro regions as shown in FIG. 4.

Returning to the overview diagram of the alternate embodiment, FIG. 8, the next step 83 is to identify an outer macro region for each tile (macro region) to be halftoned. Each outer macro region is a union of micro regions; it includes a corresponding tile (macro region) and pixels which can influence a halftoning of the tile in accordance with a processing of micro region using the step-wise parallel technique described above.

In particular, an outer macro region of a corresponding tile is generated or "grown" iteratively from the tile as set out below.

A super-set of a tile, which is referred to herein as a "super tile", comprises micro regions that include pixels whose halftone results can influence a halftoning of a macro region. A super tile is successively grown in an iterative process until the iterative process is terminated at a final super tile. The final super tile is referred to as an outer macro region of a (corresponding) tile (macro region). To initiate the iteration process, for growing a super tile to an outer macro region, a super tile is assigned a region of the image determined by a union of all micro regions which include a pixel of a tile (macro region). At each stage of the iteration process micro regions within the super tile, of a particular label number, starting with label LMAX and proceeding down to label LMIN+1, are processed by predetermined iteration steps. The predetermined iteration steps include, for micro regions of label L from LMAX to LMIN+1, the steps of:

1) identifying micro regions of label L within a super tile;
2) adding to the super tile micro regions with label number less than L that include a pixel of a micro region neighborhood of one of the identified micro regions of label L;
3) decrementing to an L−1 label micro region and iteratively repeating these three steps until all LMIN+1 label micro regions have been processed.

Figure 12:
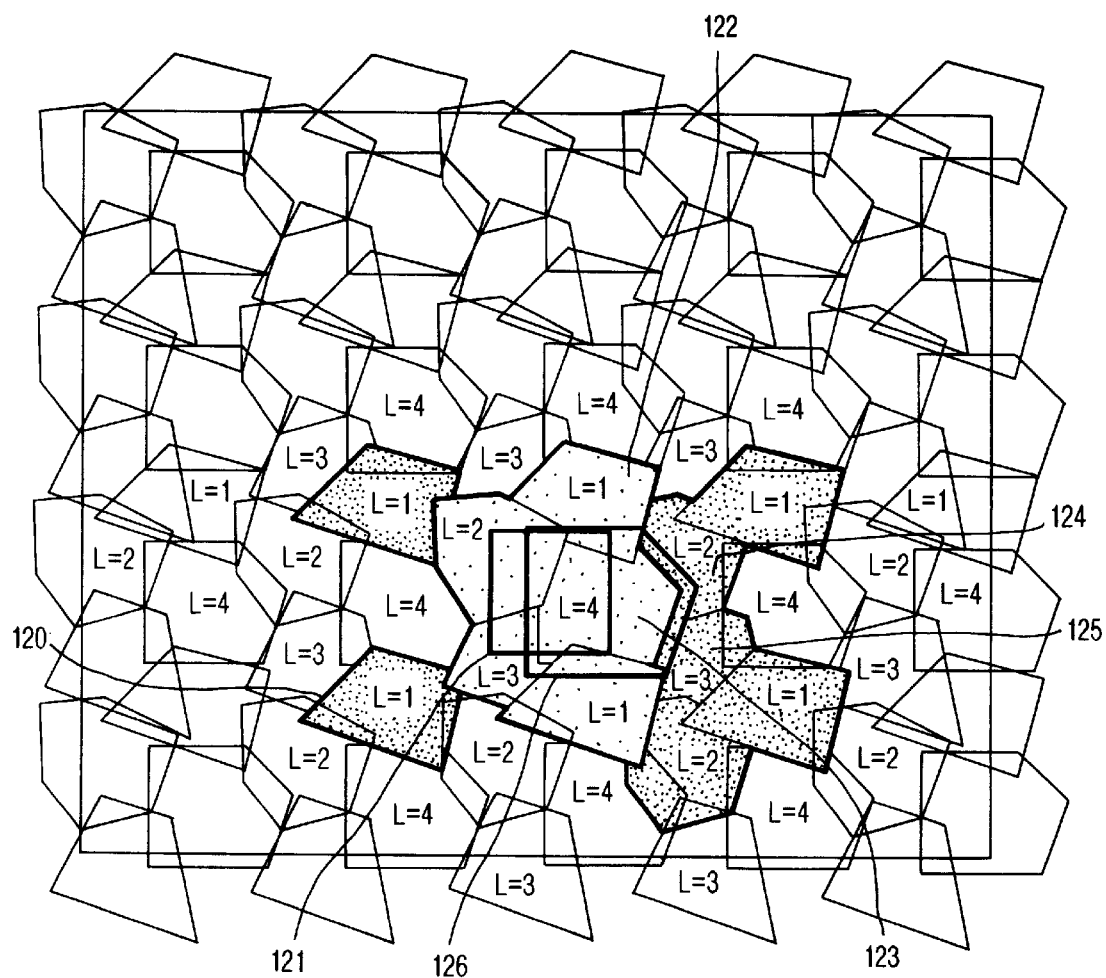
FIG. 12 illustrates an outer macro region for one of the macro regions of FIG. 11.

Referring to FIG. 12 there is shown an example of determining an outer macro region 120 for a tile (macro region) 121. For simplicity only one of a plurality of tiles 121 is shown in FIG. 12. In determining the outer macro region 120 using the iteration process described above, a super tile 122 is determined, initially, as a union of all micro regions which have at least one pixel in common with the tile 121. According to the aforementioned iteration steps, start with a highest label micro region 123 of the super tile 122 (typically LMAX) L=LMAX=4 and add to the super tile 122 all micro regions of label less than LMAX=4 which have a pixel in common with a micro region neighborhood 126 of the micro region 123 of label L=4. Once all highest labeled micro regions are processed in this manner, a next lower labeled micro region (i.e.: L=3) is processed through the iteration steps in substantially the same manner as for micro region L=4. Micro regions within a super tile are processed through the iteration steps until a final step in the iteration process is a processing of L=2 micro regions. The iteration process results in a final super tile referred to as the outer macro region 120 of the (corresponding) tile 121.

The process of determining an outer macro region for a tile can be performed in a non-iterative manner without departing from the scope and spirit of the invention. Often an outer macro region of a tile (macro region) can be readily deduced from a geometric arrangement of micro regions and macro regions and therefore no iteration steps are required to identify an outer macro region.

Again referring to FIG. 8, a final step 84 of the overview diagram is to halftone each tile in parallel (or independently) by processing a corresponding outer macro region for the tile. Each tile (macro region) is processed by using pixel input data for a corresponding outer macro region of the tile; the outer macro region is processed by using an application of the base halftoning method to halftone each micro region contained within the outer macro region; the micro regions are, preferably, halftoned in order of the micro region labels. For example, all micro regions of label 1 are halftoned first, then micro regions of the next highest label are halftoned until all micro regions of the outer macro region have been halftoned.

The techniques described in the aforementioned embodiments provide a process of halftoning an image in parallel, in the sense that each tile (macro region or macro tile) can be halftoned independently of any other tile of the image, and generates seamless halftone results for substantially all adjacent tiles.

The aforementioned embodiments can be practised (implemented) on a general purpose computer as software resident within the computer memory, including Random Access Memory (RAM), Read Only Memory (ROM), magnetic and optical storage memory such as a hard and/or floppy drive and/or CD-ROM. Further the software may be resident on another computer system accessed through a Network system or across the Internet. Images or image sequences can be halftoned by the general purpose computer in a seamless fashion for each image in an independent or parallel manner. The halftone image is then subsequently displayed on a display device. Optionally, the embodiments of the present invention can be implemented in hardware as an Application Specific Integrated Circuit (ASIC) chip dedicated to halftoning. Another example of hardware implementation is a dedicated card directly or indirectly connected to the general purpose computer which is dedicated to performing one or more of the embodiments.

Figure 13:
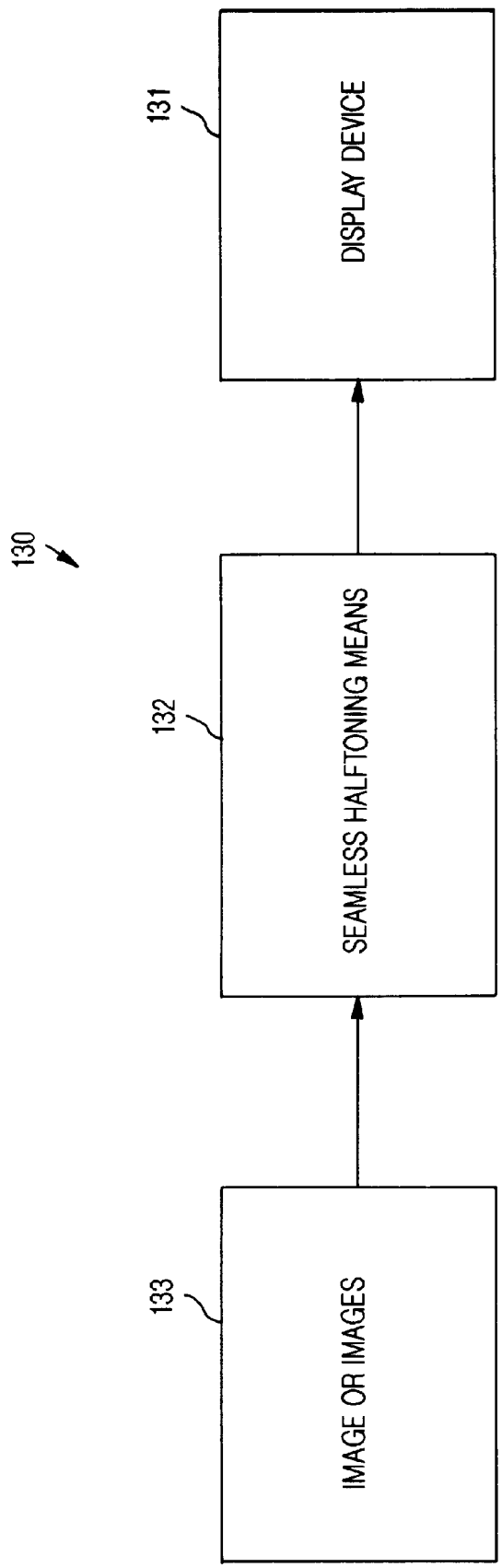
FIG. 13 depicts a generic hardware arrangement for performing the described embodiments.

FIG. 13 illustrates an example of a display system 130 in which an image is displayed on a display device. The display system 130 includes a seamless halftoning means 132 capable of receiving one or more input images 133 and outputting corresponding halftoned images to the display device 131.

Figure 14:
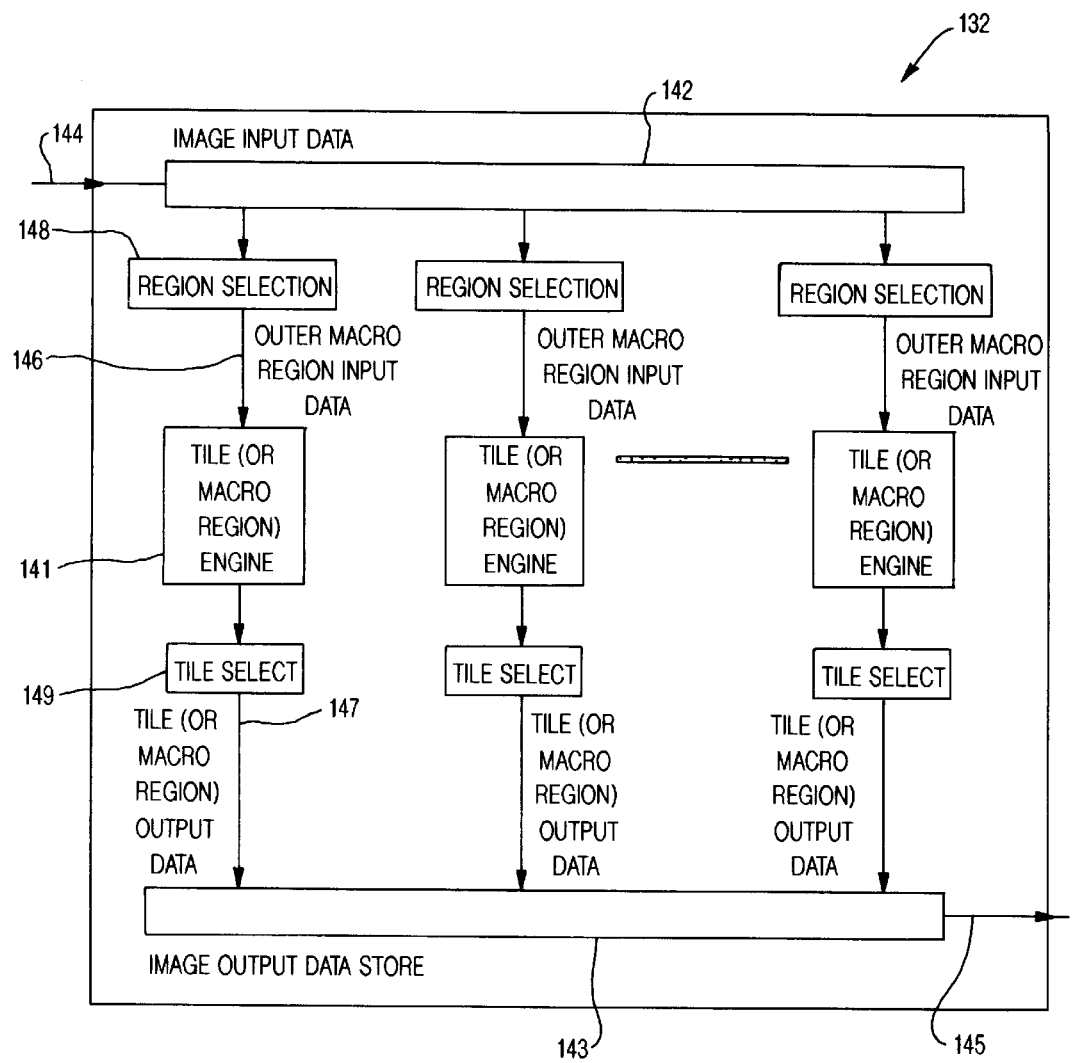
FIG. 14 is a schematic diagram of a seamless halftone means in accordance with the embodiments of the present invention.

Referring now to FIG. 14, there is shown in more detail the seamless halftoning means 132 of FIG. 13. The seamless halftoning means 132 includes a plurality of outer macro region selection (or determining) means 148, a plurality of tile (macro region or macro tiles) engines 141, an image input data store 142, a plurality of tile selection (determining) modules or circuits 149, an image output data store 143, a data input 144 and a data output 145. An image to be halftoned is received via the data input 144 and stored in the image input data store 142. Each outer macro region selection module 148 extracts from the image input data store 142 pixel information relating to an outer macro region and sends 146 the information to a corresponding tile engine 141. The tile engine 141 processes the outer macro region and outputs halftone results to a tile selection module 149. The tile selection module 149 determines (selects), from the halftone results of the outer macro region, substantially those halftone (pixel) results relating to a corresponding macro region (or tile) and stores these results in the image output data store 143. Depending upon how many tile engines are provided, a corresponding number of macro regions can be halftoned concurrently. For example, providing ten tile engines, ten macro regions can be halftoned simultaneously and subsequently another ten macro regions can be processed until all macro regions and hence substantially all pixels of the image have been halftoned. A tile engine 141 can process a macro region independently of a processing by another tile engine of another macro region, the tile engines can be operated in parallel processing mode, sequential processing mode or a combination of each of these modes. The halftoned image in the image output data store 143 is directed to the display device 131 (FIG. 13).

Figure 15:
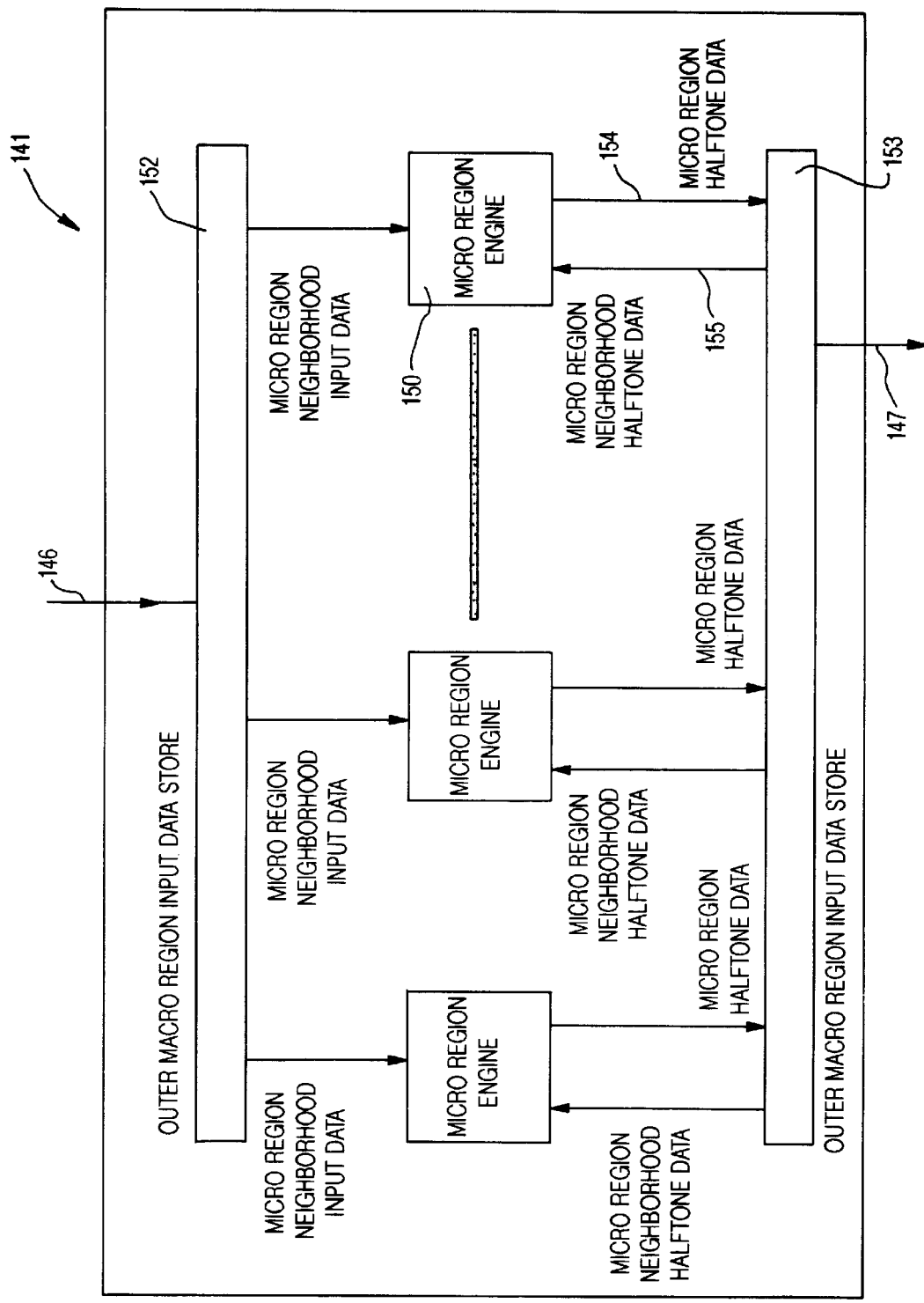
FIG. 15 is a schematic diagram of a tile engine means in accordance with the embodiments of the present invention.

FIG. 15 illustrates in more detail a tile engine 141 of FIG. 14. The tile engine 141 includes a plurality of micro region (micro tiles) engines 150, an outer macro region input data store 152 and an outer macro region output data store 153. As described above, a tile engine 141 receives, via a tile engine input 146, pixel information relating to an outer macro region. The outer macro region pixel information is stored in the outer macro region input data store 152 from which the micro region engines 150 obtain pixel information pertaining to micro regions of the outer macro region. A plurality of micro region engines 150 halftone the micro regions of the outer macro region. Preferably, the micro region engines 150 halftone all label L=LMIN micro regions then all label L=LMIN+1 micro regions then all label L=LMIN+2 micro regions, etc. until all label L=LMAX micro regions are processed. The halftoned micro regions are stored in the outer macro region output data store 153 until the outer macro region is substantially processed. From the outer macro region output data store 153 halftone results for pixels relating to a macro region (tile), corresponding to the processed outer macro regions, are extracted and output to the image output data store 143 of FIG. 14 via output 147.

Micro region engines preferably halftone micro regions having the same label in parallel and the halftone results for these micro regions are stored 154 in the outer macro region output data store 153 before a next label set of micro regions are processed. In processing a micro region halftoned pixel results of previously halftoned pixels (if any), within a corresponding micro region neighborhood, are used. The halftone pixel results of previously processed pixel within a corresponding micro region neighborhood (if any), are obtained by a micro region engine 150 from the outer macro region output data store 153 via a further input means 155. Typically, when processing a first pixel of a first label micro region, no previously halftoned pixel results are available and therefore the halftoning of the first pixel of a first label (or first processed) micro region will depend upon the selected base method used in the halftoning. However, a halftoning result for the first pixel of a first label (or first processed) micro region can be obtained by such techniques including: dithering and/or thresholding. For example, in thresholding a pixel is assigned an output value (halftone result) depending on its input value and a predetermined threshold value.

It is desirable to have as many micro region engines 150 as there are a maximum number of micro regions of the same label within any outer macro region to produce a good throughput. However, this is not always practical and a predetermined number of micro region engines 150 can be determined depending on a specific application.

The foregoing describes embodiments of the present invention. Modification, obvious to those skilled in the art, can be made thereto without departing from the scope of the invention. In particular, extension to other halftoning techniques utilizing input or output results of neighboring pixel to determine a current pixel halftone result can be adapted as a base method. Further, other configuration of micro tiles, macro tiles and outer macro tiles will readily be apparent to those skilled in the art.

What is claimed is:

1. A method of halftoning a grey scale image, said image comprising a plurality of pixels, said method comprising the steps of:

selecting a limited neighborhood halftoning base method for determining a halftone pixel result, the limited neighborhood halftoning base method being characterized by determining a halftone pixel result of a current pixel utilizing at least one previously halftone pixel result of pixels in a limited neighborhood of the current pixel;

segmenting the image into a plurality of pixel regions; and halftoning each pixel region utilizing the selected halftoning base method in a manner to achieve an identical halftone pixel result for a current pixel irrespective of the order of halftoning each of said pixel regions.

2. A method of halftoning a grey scale image, said image comprising a plurality of pixels, said method comprising the steps of:

selecting a limited neighborhood halftoning base method for determining a halftone pixel result, wherein said limited neighborhood halftoning base method is characterized by determining a halftone pixel result of a current pixel utilizing at least one previously halftoned pixel result of pixels within a predetermined limited neighborhood of the current pixel, segmenting the image into a plurality of pixel regions, and halftoning each of said pixel region independently, utilizing said selected halftoning base method to achieve seamless halftone results across the image.

3. A method of halftoning a grey scale image, said image comprising a plurality of pixels, said method comprising the steps of:

selecting a halftoning base method, wherein said halftoning base method is characterized by determining a halftone pixel result of a current pixel utilizing at least one halftone result of a previously halftoned pixels within a predetermined distance of the current pixel;

dividing the image into a plurality of adjacent first regions comprising more than one pixel;

segmenting the image into a plurality of (non-overlapping) second regions adapted to substantially cover the image;

halftoning each pixel of said second region utilizing the selected halftoning base method in a manner to achieve an identical halftone pixel result for a current pixel irrespective of the order of halftoning each of said second regions.

4. A method of halftoning a grey scale image as claimed in claim 1, wherein each of said plurality of pixel regions, further comprise a plurality of non-overlapping sub-regions of pixels.

5. A method as claimed in any of claims 1 to 3, wherein each of said pixel regions is halftoned independently.

6. A method as claimed in any of claims 1–3, wherein more than one of said pixel regions are halftoned in parallel.

7. A method as claimed in any of claims 1–3, wherein the limited neighborhood halftoning base method is further characterized in that input values of pixel within the limited neighborhood are utilized in determining the halftone pixel result of the current pixel.

8. A method as claimed in any of claims 1–3, wherein the limited neighborhood halftoning base method is a Force Field Halftoning technique.

9. A method as claimed in any one of claims 1–3, wherein each pixel of said image has a plurality of color components and each of said color components is halftoned independently.

10. A method as claimed in claim 8, wherein said non-overlapping sub-regions of pixels within each of said plurality of pixel regions are labeled in accordance with a predetermined order or sequence for halftoning said sub-regions.

11. A method as claimed in claim 10, wherein labeling each non-overlapping sub-region of pixels in accordance with a predetermined order or sequence, further includes the steps of:

determining a limited neighborhood distance to be a minimum distance between two pixels, for the selected limited neighborhood halftoning base method, wherein a halftone result of one of the two pixels can be obtained independently of the result of the other of the two pixels; and labeling each sub-region in a manner that each pixel in a sub-region having a first label is distant to each pixel of a second sub-region having the same first label by at least the limited neighborhood distance.

12. A method of halftoning a grey scale image, said image comprising a plurality of pixels, said method comprising the steps of:

selecting a limited neighborhood halftoning base method for determining a halftone pixel result, said limited neighborhood halftoning base method being characterized by determining a halftone pixel result of a current pixel utilizing at least one halftone result of a previously halftoned pixel;

determining a limited neighborhood distance to be a minimum distance between two pixels, for the selected limited neighborhood halftoning base method;

dividing the image into a plurality of adjacent non-overlapping first regions comprising more than one pixel;

labeling each of said first regions with a predetermined order representing an order for halftoning said first regions;

grouping said first regions to provide a plurality of second regions adapted to substantially cover without overlap the image to be halftoned;

segmenting the image into a plurality of third regions of pixels comprising at least one of said second regions and a minimum number of first regions having pixels with halftone results capable of contributing to at least one pixel of the second region;

halftoning each pixel of said second region utilizing the selected halftoning base method in a manner to achieve an identical halftone pixel result for a current pixel irrespective of the order of halftoning each of said second regions.

13. A method as claimed in claim 12, wherein the limited neighborhood halftoning base method utilizes halftone results of substantially all previously halftoned pixels within the limited neighborhood.

14. A method claimed in claim 12, wherein a halftone result of one of the two pixels can be obtained independently of the result of the other of the two pixels.

15. A method claimed in claim 12, wherein each pixel of any one said first regions having a first lable is at least a limited neighborhood distance away from which each pixel of anotehr one of said first regions having the same label.

16. A method claimed in claim 12, wherein each of said second regions comprise a predetermined integral number of first regions.

17. A method of halftoning a digital image, said image comprising a plurality of pixels, said method comprising the steps of:

selecting a halftoning base method characterized by determining a halftone pixel result of a current pixel utilizing at least one previously halftone pixel result of pixels in a predetermined neighborhood of the current pixel;

dividing the image into a plurality of first pixel regions;

segmenting the image into a plurality of second pixel regions; and halftoning each first pixel region in a manner to provide seamless halftone results between adjacent second pixel regions of said image.

18. A method as claimed in claim 17, wherein the halftoning of the first pixel regions are performed in such a manner as to provide halftone of a second pixel region independently of another second pixel region.

19. A method as claimed in claim 17, wherein the halftone results of a second pixel region are generated in parallel with halftone results of at least one another second pixel region.

20. A method as claimed in claim 17, wherein halftoning each first pixel region further includes identifying a predetermined number of first pixel regions which upon halftoning said predetermined number of first pixel regions provide halftone result of pixels of a corresponding second pixel region.

21. A method as claimed in claim 17, wherein the limited neighborhood halftoning base method is further characterized by a neighborhood distance for which determination of a halftone pixel result for a current pixel is independent of the halftone result of a pixel which is separated form the current pixel by more than the neighborhood distance.

22. A method as claimed in claim 21, wherein the limited neighborhood halftoning base method is further characterized by determining the halftone pixel result for the current pixel by using a previously halftoned pixel result depending on a distance measure between the current pixel and the previously halftoned pixel.

23. A seamless halftoning apparatus comprising:

an image input data store for receiving a digital input image comprising pixels to be halftoned;

a region selection means for selecting from said input store predetermined first region of the input image;

a tile halftone engine for halftoning said selected first region;

a tile selection means coupled to the tile halftone engine for determining from the halftoned first region, a second region comprising halftoned pixels; and an image output data store for storing said second region of halftoned pixels.

24. A seamless halftoning apparatus as claimed in claim 23, wherein said tile halftone engine further comprises a plurality of micro region engines adapted to select from the first region a plurality of third regions and halftone said third regions to generate halftone results of substantially all pixels of said first region.

25. A seamless halftoning apparatus as claimed in claim 23, wherein said tile halftone engine further comprises a first region input data store.

26. A seamless halftoning apparatus as claimed in claim 23, wherein said tile halftone engine further comprises a first region output data store.

27. A seamless halftoning system, capable of halftoning an image in a parallel blockwise manner, comprising a plurality of tile engines adapted to halftone a multitude of regions of the image, wherein each tile engine is able to halftone at least one region of the image, and wherein more than one tile engine provide halftone results of the image concurrently.

28. A seamless halftoning system as claimed in claim 27, wherein the halftone result of a current pixel is the same irrespective of an order of processing the multitude of regions.

* * * * *

UNITED STATES PATENT AND TRADEMARK OFFICE
CERTIFICATE OF CORRECTION

PATENT NO. : 6,130,661  
DATED : October 10, 2000  
INVENTOR(S) : Ilbery

Page 1 of 1

It is certified that error appears in the above-identified patent and that said Letters Patent is hereby corrected as shown below:

<u>Column 14,</u>  
Line 27, "halftone" should read -- halftoned --.

<u>Column 15,</u>  
Line 2, "regions," should read -- regions --.

<u>Column 16,</u>  
Line 12, "lable" should read -- label --;  
Line 13, "which" should be deleted;  
Line 14, "anotehr" should read -- another --;  
Line 49, "form" should read -- from --; and  
Line 55, "measure" should read -- measured --.

Signed and Sealed this

Thirtieth Day of April, 2002

Attest:

Attesting Officer

JAMES E. ROGAN  
Director of the United States Patent and Trademark Office